July 27, 1965 H. C. BORISCH 3,196,570
ICE FISHING TIP-UP
Filed Sept. 11, 1963
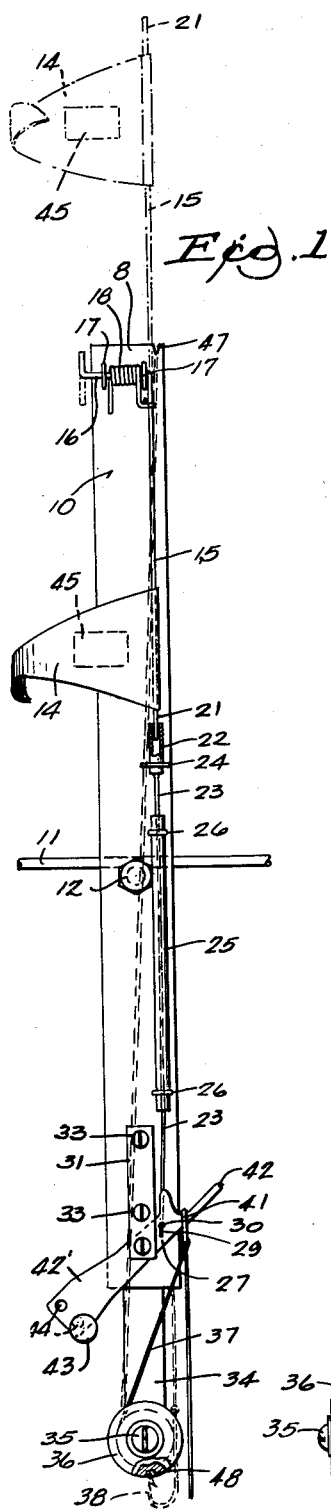
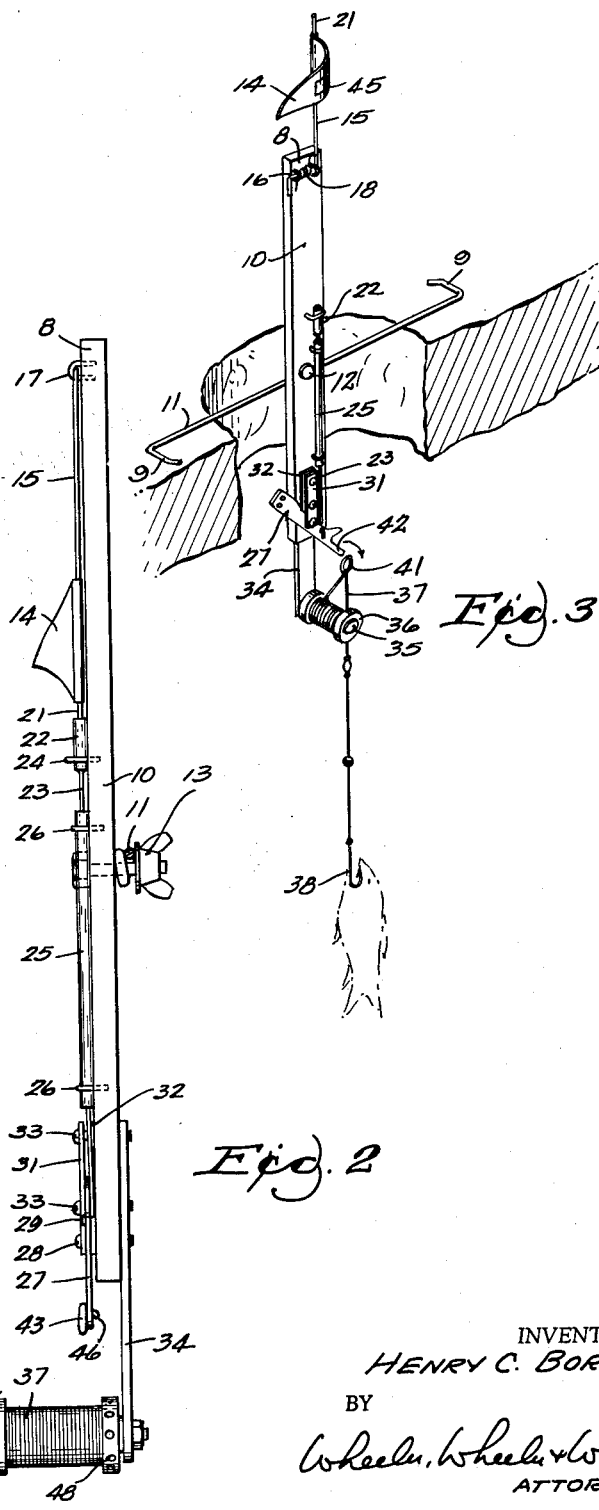
INVENTOR.
HENRY C. BORISCH
BY
Wheeler, Wheeler & Wheeler
ATTORNEYS United States Patent Office 3,196,570
Patented July 27, 1965

3,196,570
ICE FISHING TIP-UP
Henry C. Borisch, Rte. 1, Box 193, Crandon, Wis.
Filed Sept. 11, 1963, Ser. No. 308,107
5 Claims. (Cl. 43—17)

This invention relates to an improved ice fishing tip-up.
Ice fishing tip-ups embodying the present invention have one or more of the following features and advantages:

A. There is a positive interlock between the end of a retracted rigid flagstaff and the socketed end of an axially movable tubular latch. Accordingly, the flagstaff is not subject to accidental release under wind pressure.

B. There is a positive stop for the flagstaff when it is in its upright or advanced position, thus to eliminate whiplash of the flagstaff and consequent vibration of the tip-up which would tend to frighten off the fish.

C. There is a trigger with a weighted end the resistance of which the fish must overcome in the course of striking the bait. This weight is desirably adjustable so that the tip-up can be readily adapted for catching any type and size of fish.

D. The latch stem passes through a tube packed with a lubricant having a low freezing point thus to insure trouble free operation of the tip-up in freezing weather.

Other objects, features and advantages of the invention will appear from the following disclosure in which:

FIGURE 1 is a front elevation of a fishing tip-up embodying the present invention.

FIGURE 2 is a side elevation of the tip-up shown in FIGURE 1.

FIGURE 3 is a perspective view on a reduced scale showing the tip-up of the present invention in use, a fragment of an ice fishing hole being shown diagrammatically and in cross section.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The tip-up consists of a mast 10 which may be made of wood or plastic or the like and to which an ice hole spanning metal bracket rod 11 is pivotally mounted on the bolt 12 which has wing nut tightener 13. The spanner bracket 11 may be folded against the mast 10 for transport, as is conventional, and has oppositely turned ends 9 to stabilize the mast in use as shown in FIGURE 3.

At the top of the mast there is a strike indicator consisting, in the disclosed embodiment, of a flag 14 on a rigid staff 15. The butt end of the staff 15 is turned laterally to form a rock shaft 16 which is pivotally mounted in the bights of staples 17 affixed near the top of the mast at a short spacing from the mast end. A coil spring 18 is wound around the shaft 16 and biases the staff to its upright or advanced position shown in FIGURE 3 and in dotted lines in FIGURE 1.

Pending a strike, the strike indicator is held in its retracted or downwardly depending position, as shown in full lines in FIGURES 1 and 2, by engagement of its projecting tip end 21 with a socketed latch tube 22 which is mounted at the end of a latch stem 23. Because the staff 15 is rigid and is positively held in latch tube 22, it is immune to gusts of wind etc. which might othewise prematurely release the strike indicator. Latch tube 22 is guided for axial movement by a staple 24.

Stem 23 passes through a fixed antifreeze lubricant packed protective tube 25 which is fastened to the mast by staples 26. The lower end of the stem 23 is bent at 29 to engage with a trigger lever 27 through a hole 30 therein. Trigger 27 is free to pivot on the axis of pin 28.

Trigger 27 is constrained in its pivotal movement by the guide plates 31, 32 which are spaced apart slightly to receive the trigger 27 therebetween and which are fastened to the mast by pins 33 and pin 28.

Downwardly projecting from the bottom end of the mast 10 is a bracket 34, also held to the mast by the pins 28 and 33 and which carries on pivot bolt 35 a reel 36 on which line 37 is wound. At the desired fishing depth or distance from hook 38, line 37 is provided with a ring 41 which may be slipped over finger 42 of the trigger 27, as shown in FIGURE 1. The other end of the trigger lever 27 is weighted at 42' so that absent a strike or pull on the line, the weight 42' will maintain the trigger in its upwardly inclined position as shown in FIGURE 1 to keep the ring 41 on the finger 42.

When a fish strikes the hook 38, the pull on the line 37 may be sufficient to overcome the resistance of weight 42' and hence rotate the trigger 27 to its position shown in FIGURE 3, whereupon the ring 41 will slip off of the finger 42 and the fish may then run freely with the line 37 which may unwind from the reel 36 to the limit of a fixed connection of its end therewith.

When the trigger 27 has rotated to its position shown in FIGURE 3, the latch stem 23 will be drawn axially downwardly to draw the socketed latch tube 22 away from confining engagement with the tip 21 of the flagstaff 15. As soon as this occurs, the spring 18 will rotate the flagstaff 14 to the upright advanced position thereof shown in FIGURE 3 and in dotted lines in FIGURE 1, thus displaying flag 14 and apprising the fisherman of a strike.

It is highly desirable that the flagstaff 15 be rigid, thus to avoid the whiplash which is common in fishing tip-ups having spring type flagstaffs. The whip of such prior art flagstaffs causes vibration in the mast which may frighten away a fish which is not yet hooked. Accordingly, when a fishing tip-up embodying the present invention is used, the fish will continue biting, even after the strike indicator has been released.

In accordance with the present invention, the portion 8 of the mast above the rock shaft 16 functions as a positive stop or abutment for the rigid mast, thus to stabilize the strike indicator in its upright or advanced position under pressure of spring 18. Whipping or oscillation of the strike indicator is thus precluded.

In order to adjust the fishing apparatus at the lower end of the mast for fishing various types and sizes of fish, one or more additional weights 43 may be added to the end 42' of the trigger lever 27. For this purpose the lever may be provided with small holes 44 to receive tongue portions 46 of the lead weights 43. When the end 42' of the trigger lever 27 is fully weighted it will take a greater pull on the line 37 to actuate the trigger than when it is lightly weighted.

If desired, a patch 45 of reflective material may be attached to the flag 14 at one side thereof for use in night fishing. When the flag is in retracted position, as shown in FIGURE 1, the patch will be behind the flag and will not reflect light from the beam of a flashlight used by the fisherman to illuminate the tip-up from a distance. However, if the strike indicator has been released and moved to its upright advanced position, the reflective patch 45 will reflect the beam of the flashlight, thus apprising the fisherman of a strike. Accordingly, even at night, the fisherman may set many tip-ups in operation and can station himself in a warming house at a distance and merely by observing in the daytime or by directing the beam of a flashlight at the several tip-ups at night, ascertain when a strike has occurred.

The top of the mast may also be provided with a notch 47 in which the line 37 may be engaged and the hook 38 concurrently engaged in one of the sockets 48 in the reel 36 during storage and transport of the tip-up.

I claim:
1. An ice fishing tip-up comprising:
   a mast,
   a strike indicator at the top of the mast and having a rigid staff with a projecting end portion, a pivoted mounting therefor and spring means biasing said staff from a downwardly extending, retracted position toward an upwardly extending strike indicating advanced position,
   fishing apparatus at the bottom of the mast,
   a trigger and a trigger mount on which a portion of the trigger is pulled downwardly in response to a fish strike at said apparatus,
   and motion transmitting connections from said trigger to said staff and including axially movable stem means extending longitudinally of the mast, a connection from the stem means to the trigger at one end and a tubular socket at the other end of the stem means into which the projecting end of the staff is received to normally hold the staff retracted subject to release therefrom on downward movement of the stem means to withdraw the tubular socket from about the projecting end portion of the staff and projection by the spring means to advanced position as a consequence of trigger actuation.

2. The tip-up of claim 1 in which the mast is provided with a positive stop against which the rigid staff abuts in its advanced position.

3. The tip-up of claim 1 in which said fishing apparatus comprises a reel and a line wound thereon, said trigger comprising a lever, said trigger mount comprising pivot means pivoting the lever to the mast, means for coupling the line to one end of the lever at one side of the pivot means and adjustable weight means at the other end of the lever at the other side of the pivot means to adjust the resistance of the trigger to line pull.

4. The tip-up of claim 3 in which said adjustable weight means comprises means for releasably attaching weights to said other end of the lever.

5. An ice fishing tip-up comprising:
   a mast,
   a movable strike indicator at the top of the mast,
   fishing apparatus at the bottom of the mast,
   a trigger responsive to a fish strike at said apparatus,
   motion transmitting connections from said trigger to said strike indicator to actuate said strike indicator as a consequence of trigger actuation,
   said fishing apparatus comprising a reel and a line wound thereon,
   said trigger comprising a lever, pivot means pivoting the lever to the mast,
   means for coupling the line to one end of the lever at one side of the pivot means and adjustable weight means at the other end of the lever at the other side of the pivot means and which must be overcome by the pull on the line caused by a fish strike to actuate the trigger.

References Cited by the Examiner
UNITED STATES PATENTS

| | | | |
|---|---|---|---|
| 479,219 | 7/92 | Lane | 43—17 |
| 2,122,841 | 7/38 | Laurila | 43—17 X |
| 2,170,000 | 8/39 | Eggleston | 43—17 |
| 2,193,747 | 3/40 | Thompson | 116—173 |

ABRAHAM G. STONE, *Primary Examiner.*
SAMUEL KOREN, *Examiner.*